(12) United States Patent
Chen et al.

(10) Patent No.: US 12,390,895 B1
(45) Date of Patent: Aug. 19, 2025

(54) PIPE-ASSEMBLING MACHINE

(71) Applicant: CHEN TA PRECISION MACHINERY INDUSTRIAL INC., Kaohsiung (TW)

(72) Inventors: Chen-Chia Chen, Kaohsiung (TW); Yu-Hsin Chao, Kaohsiung (TW); Wen-Liang Wang, Kaohsiung (TW)

(73) Assignee: Chen Ta Precision Machinery Industrial Inc., Kaohsiung (TW)

( * ) Notice: Subject to any disclaimer, the term of this patent is extended or adjusted under 35 U.S.C. 154(b) by 0 days.

(21) Appl. No.: 18/797,642

(22) Filed: Aug. 8, 2024

(30) Foreign Application Priority Data

May 16, 2024 (TW) .................................. 113205039

(51) Int. Cl.
  *B23P 19/04* (2006.01)
  *B21J 15/14* (2006.01)
  *F16B 7/04* (2006.01)

(52) U.S. Cl.
  CPC .............. *B23P 19/04* (2013.01); *B21J 15/14* (2013.01); *F16B 7/0406* (2013.01)

(58) Field of Classification Search
  CPC ......... B23P 19/04; B23P 19/061; B23P 19/10; B23P 19/12; B23P 21/002; B21J 15/10; B21J 15/12; B21J 15/14; B21J 15/30; Y10T 29/53987; Y10T 29/49956; Y10T 29/49895; Y10T 29/49899; Y10T 29/49902; Y10T 29/29998; Y10T 29/53961; Y10T 29/53978; F16B 7/00; F16B 7/0406; F16L 13/00; F16L 21/00–002; F16L 21/08
  See application file for complete search history.

(56) References Cited

U.S. PATENT DOCUMENTS 6,164,165 A * 12/2000 Browning ............. B23P 19/061
                                                          81/57.35

FOREIGN PATENT DOCUMENTS

| CN | 108994245 A | * | 12/2018 | .............. B21J 15/10 |
| CN | 116329929 A | * | 6/2023 | |
| KR | 20190099665 A | * | 8/2019 | |

* cited by examiner

*Primary Examiner* — Matthew P Travers
(74) *Attorney, Agent, or Firm* — Snell & Wilmer L.L.P.

(57) ABSTRACT

A pipe-assembling machine configured to assemble two pipes to a reducer. The pipe-assembling machine comprises a table, a rotation device and two assembling devices both mounted at the table. The assembling devices are respectively disposed at two sides of the rotation device, which comprises a base and a rotationally-driving mechanism connected to and driving the base to rotate along an axial direction. Each assembling device has an assembling element being movably parallel to the table. The pipe-assembling machine is configured for allowing the reducer to be mounted on the base with the two pipes preliminarily mounted at two ends of it. The assembling devices are configured for assembling fastener elements to connecting holes of the pipes and the reducer through the assembling element to assemble the pipes to the reducer.

20 Claims, 13 Drawing Sheets

PIPE-ASSEMBLING MACHINE

BACKGROUND OF THE INVENTION

1. Field of the Invention

The present invention relates to a pipe-assembling machine, especially to a pipe-assembling machine configured to assemble pipes to a reducer.

2. Background

A reducer is a machine used to reduce rotational speed to increase torque outputting. Two ends of the reducer are respectively defined as an input end and an output end. The input end is connected to an inputting element. The output end is connected to an outputting element. The inputting element applies a torsional force with higher rotational speed and lower torque to the input end of the reducer. The reducer reduces the rotational speed, and then outputs a torsional force to the outputting element through the outputting end. Therefore, the outputting element generates a torsional force with lower rotational speed and higher torque.

There are several ways to use the reducer. One of them is to use pipes as the inputting and outputting elements. Two pipes are respectively mounted and fixed at the input end and the output end of the reducer to be use.

To install pipes to a reducer, the method nowadays is as follows. A connecting end of the pipe has multiple connecting holes formed on a surrounding wall of the pipe at spaced intervals and surrounding the whole connecting end. Installation personnel assemble the connecting ends of the two pipes onto the input end and the output end of the reducer respectively, then insert multiple rivets into the connecting holes of the connecting ends so the rivets reach into the input end and the output end. Then, the personnel use rivet guns to fasten the rivets until each connecting hole of the pipes is securely riveted to the reducer to complete assembling the pipes to the reducer.

However, when assembling the pipes, there might be tolerance between the pipes and the reducer, which leads to the pipes shifting or deviating. Besides, the personnel hold the rivet guns by hands to fasten the rivets at different angles, so an angle of the rivet guns is decided purely by the personnel, and thus, errors are prone to happen, causing a lower accuracy of riveting. Furthermore, due to the multiple connecting holes surrounding the whole pipe, some of the connecting holes are covered. So, all of the connecting holes and the rivets cannot be fastened at the same time. The personnel have to turn the reducer and pipes over to reveal the covered connecting holes to rivet them. This is time-consuming and inefficient.

SUMMARY OF THE INVENTION

The main objective of the present invention is to provide a pipe-assembling machine to resolve drawbacks that a method of assembling pipes to a reducer nowadays is to manually turn the reducer over, which has a lower accuracy of riveting and is time-consuming with low efficiency.

The pipe-assembling machine is configured to assemble two pipes to a reducer along an axial direction, wherein each pipe has a connecting end having multiple connecting holes, which are formed on the connecting end at spaced intervals with the axial direction as an axial center. The connecting ends of the two pipes are respectively mounted at two ends of the reducer. The pipe-assembling machine comprises a table, a rotation device and two assembling devices. The rotation device comprises a base and a rotationally-driving mechanism. The base is pivotably mounted on the table and is pivotable along the axial direction. The base is configured for detachably mounting the reducer. The rotationally-driving mechanism is mounted at the table, is connected to the base, and can drive the base to pivot. The two assembling devices are respectively mounted at the table and are disposed at two sides of the rotation device along the axial direction. Each one of the two assembling devices has an assembling element movably parallel to the table and toward the reducer. The two assembling devices are configured for respectively corresponding to the two pipes. The assembling element of each of the two assembling devices is configured for assembling multiple fastener elements to the multiple connecting holes of the connecting end of the corresponding pipe and the reducer to assemble the corresponding pipe to the reducer.

The pipe-assembling machine is configured to assemble two pipes to a reducer. During assembling, personnel operate the assembling elements of the two assembling devices to move the assembling elements approaching the reducer mounted on the base. The assembling elements are used to assemble the multiple fastener elements, which are near the assembling elements, to the connecting holes of the connecting ends of the two pipes and the reducer. Then, the personnel operate the rotationally-driving mechanism to rotate the base, and the reducer and the two pipes are rotated as well. Therefore, the connecting holes that are not yet assembled with the fastener elements face toward the assembling elements, and the fastener elements can be assembled to the two pipes and the reducer through the assembling elements.

In addition, since the assembling elements of the two assembling devices can only be moved parallel to the table, the assembling elements have fixed height positions and are unable to pivot, therefore ensuring accuracy of assembling the fastener elements. Besides, the two assembling devices can be respectively operated by two installation personnel. So, two connecting holes that are disposed at two sides of a pipe and are symmetrical in position can be assembled with the fastener elements at the same time, therefore the pipe receives forces from two sides in balance, thus increasing the accuracy of assembling. Furthermore, the reducer and the two pipes are rotated by the rotation device without manual interference, thereby saving workhours and manual force, and increasing work efficiency.

DETAILED DESCRIPTION OF THE PREFERRED EMBODIMENT

Figure 1:
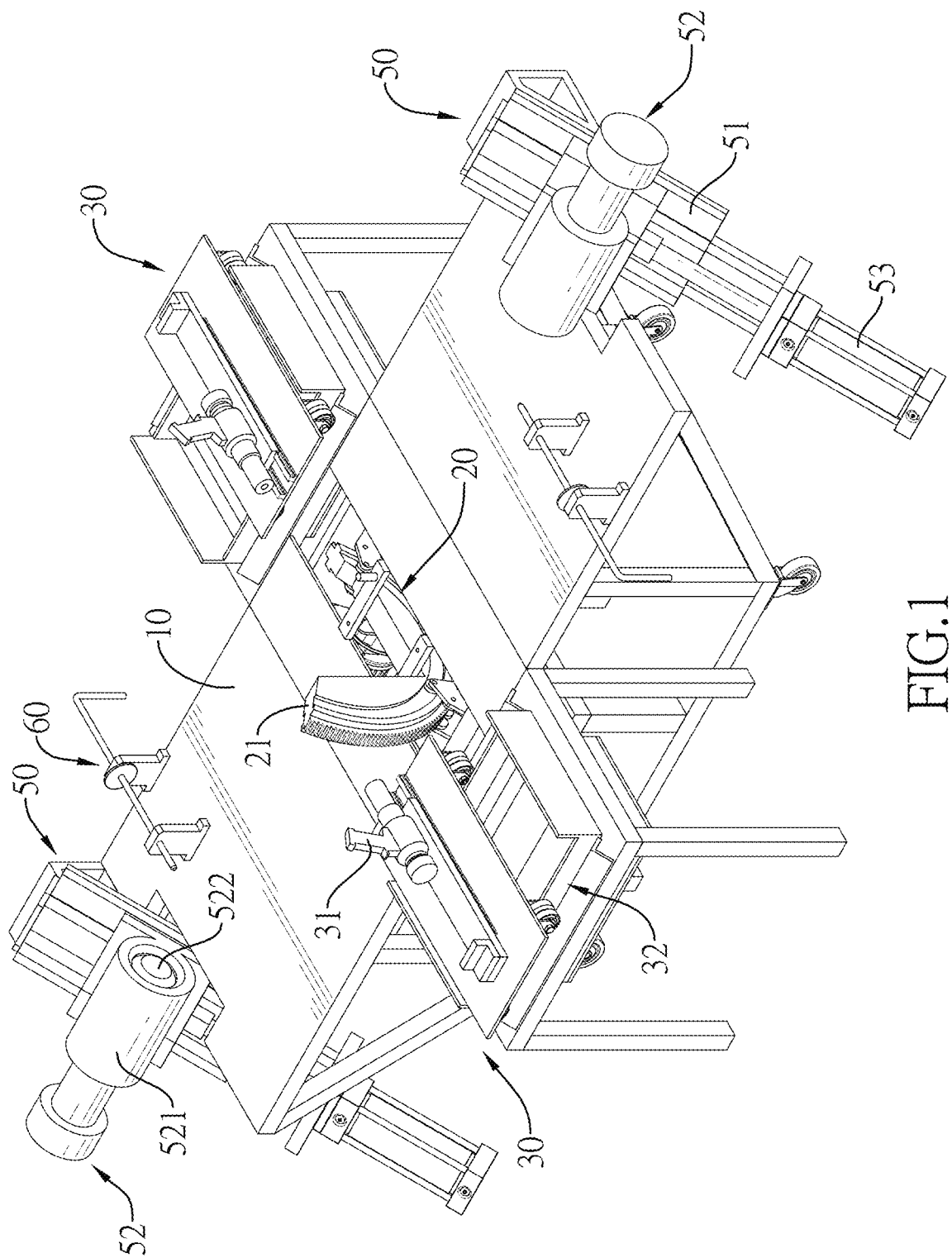
FIG. 1 is a perspective view of an embodiment of a pipe-assembling machine in accordance with the present invention.
Figure 7:
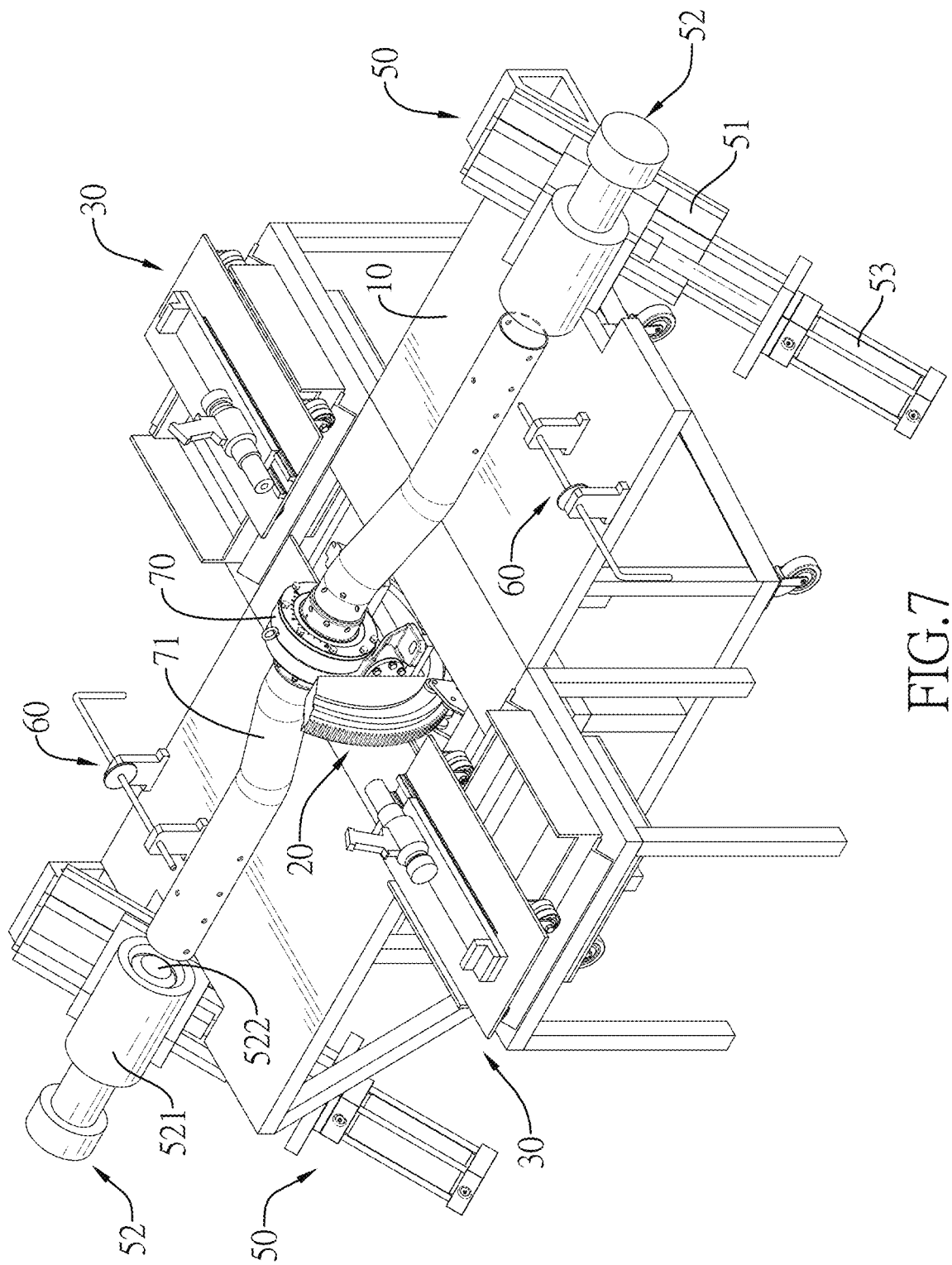
FIG. 7 is a perspective view of the pipe-assembling machine in accordance with the present invention, showing pipes assembled to the reducer.

FIGS. 1 and 7 show an embodiment of a pipe-assembling machine in accordance with the present invention. The pipe-assembling machine is configured to assemble two pipes 71 to a reducer 70 along an axial direction. Each one of the two pipes 71 has a connecting end having multiple connecting holes formed on a surrounding wall of the pipe 71 and surrounding the connecting end of said pipe 71 at spaced intervals with the axial direction as an axial center. The pipe-assembling machine comprises a table 10, a rotation device 20 and two assembling devices 30.

Figure 3:
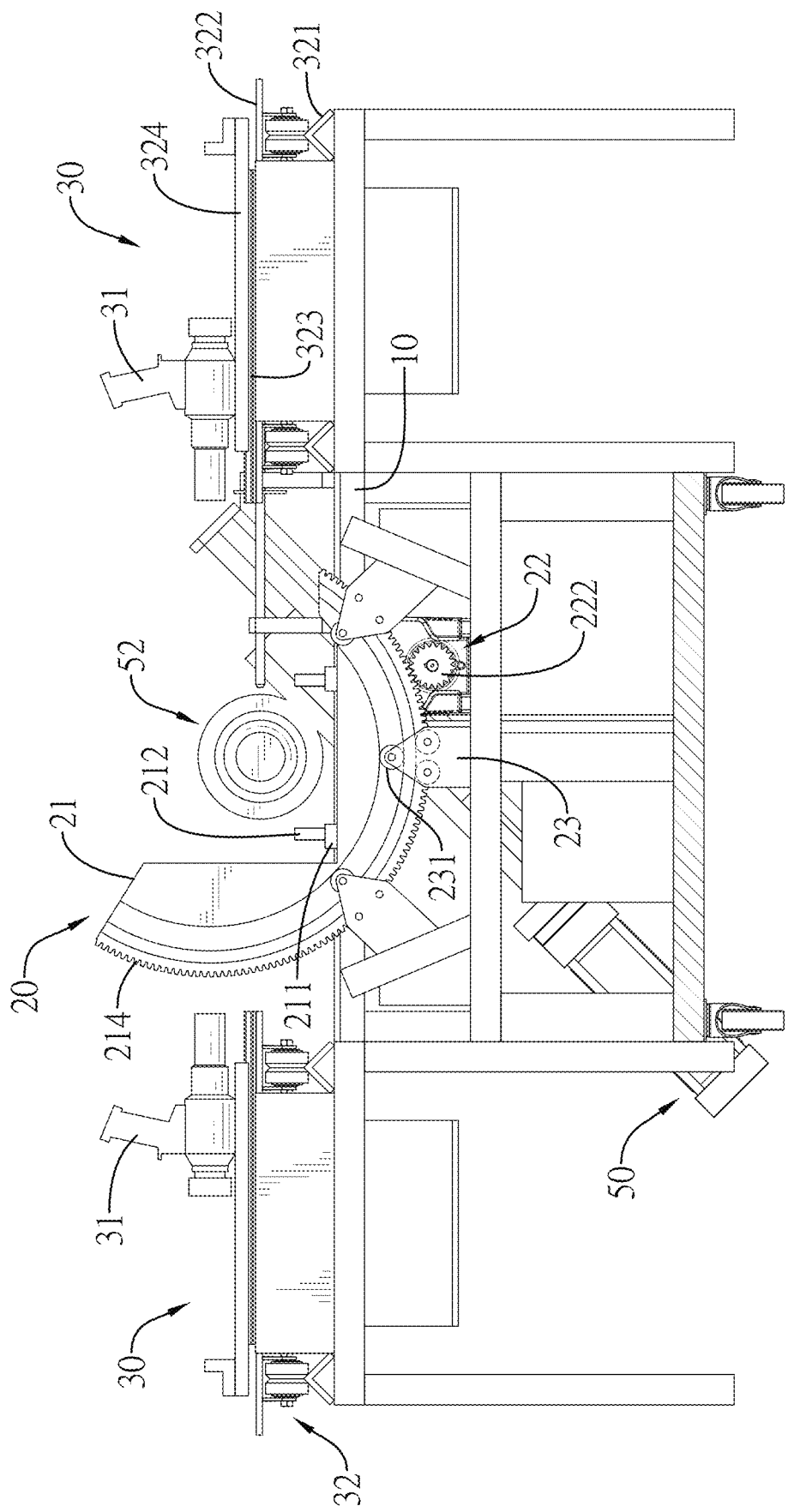
FIG. 3 is a sectional view across line 3-3 in FIG. 2.
Figure 4:
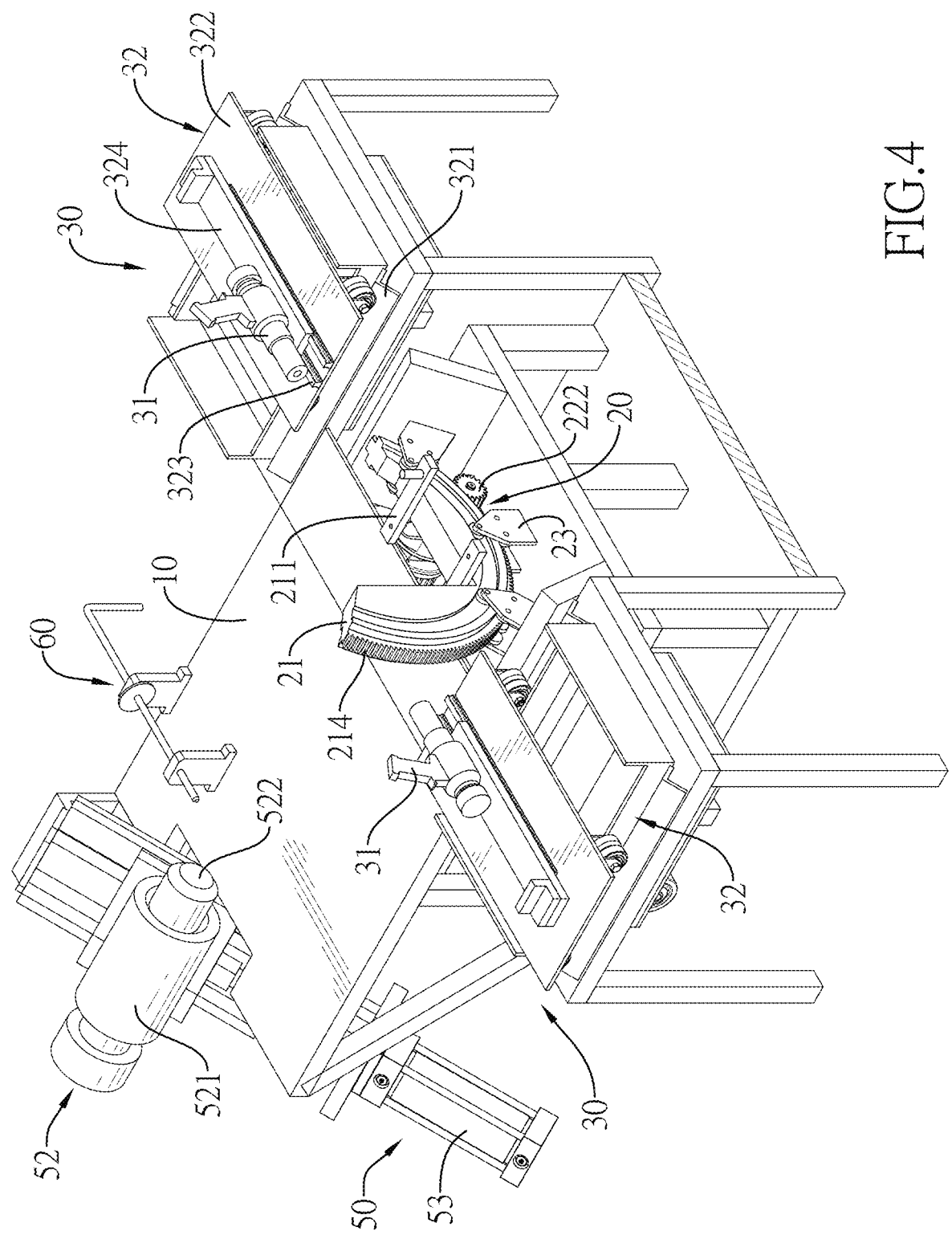
FIG. 4 is a partial perspective view of the pipe-assembling machine in accordance with the present invention.
Figure 5:
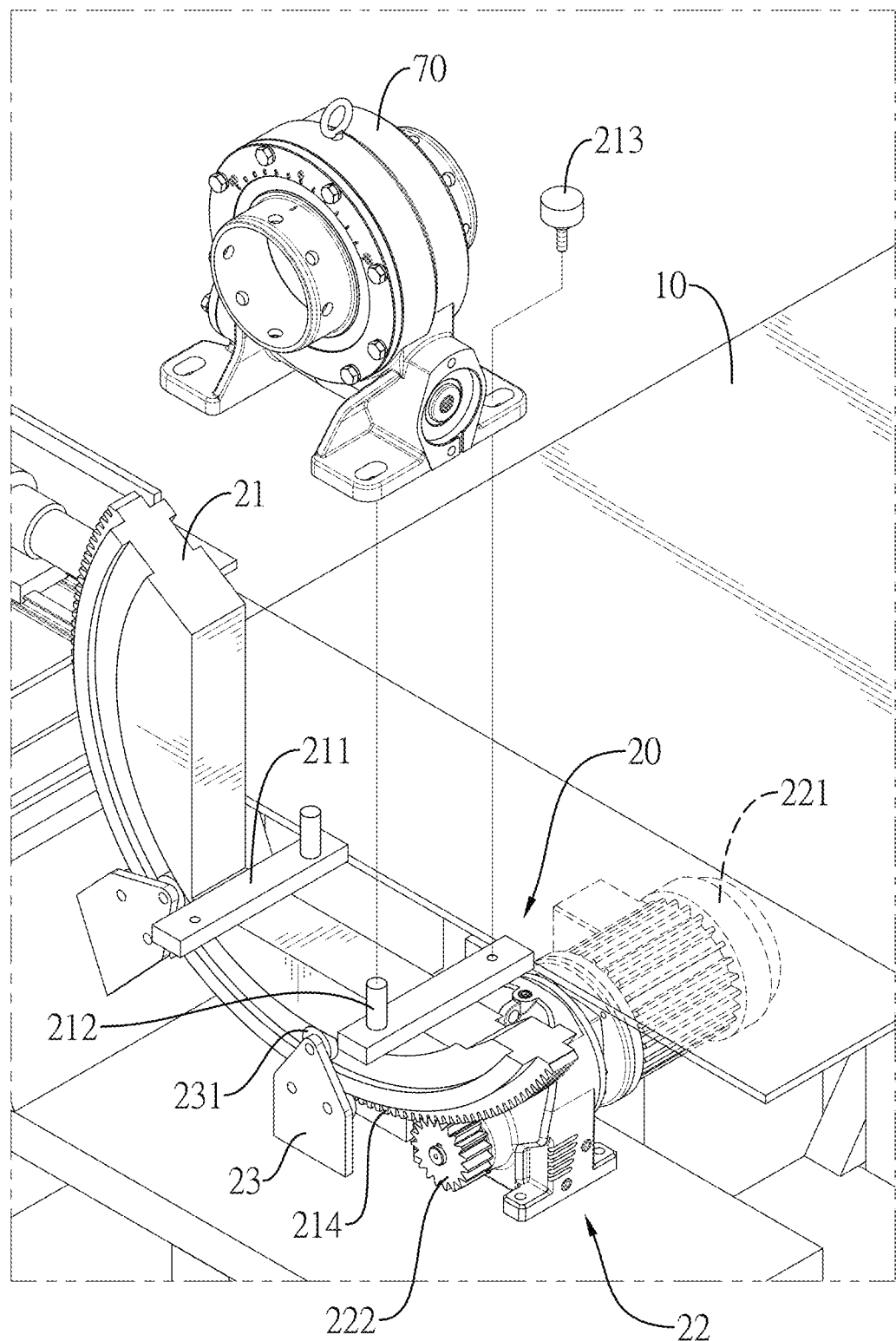
FIG. 5 is a perspective view of the pipe-assembling machine in accordance with the present invention, showing mounting a reducer on a base of a rotation device.

With reference to FIGS. 1 to 4, the rotation device 20 comprises a base 21 and a rotationally-driving mechanism 22. The base 21 is pivotably mounted on the table 10 and is pivotable along the axial direction. The rotationally-driving mechanism 22 is mounted at the table 10, is connected to the base 21, and can drive the base 21 to pivot. As shown in FIGS. 5 and 7, the reducer 70 is detachably mounted at the base 21.

Figure 2:
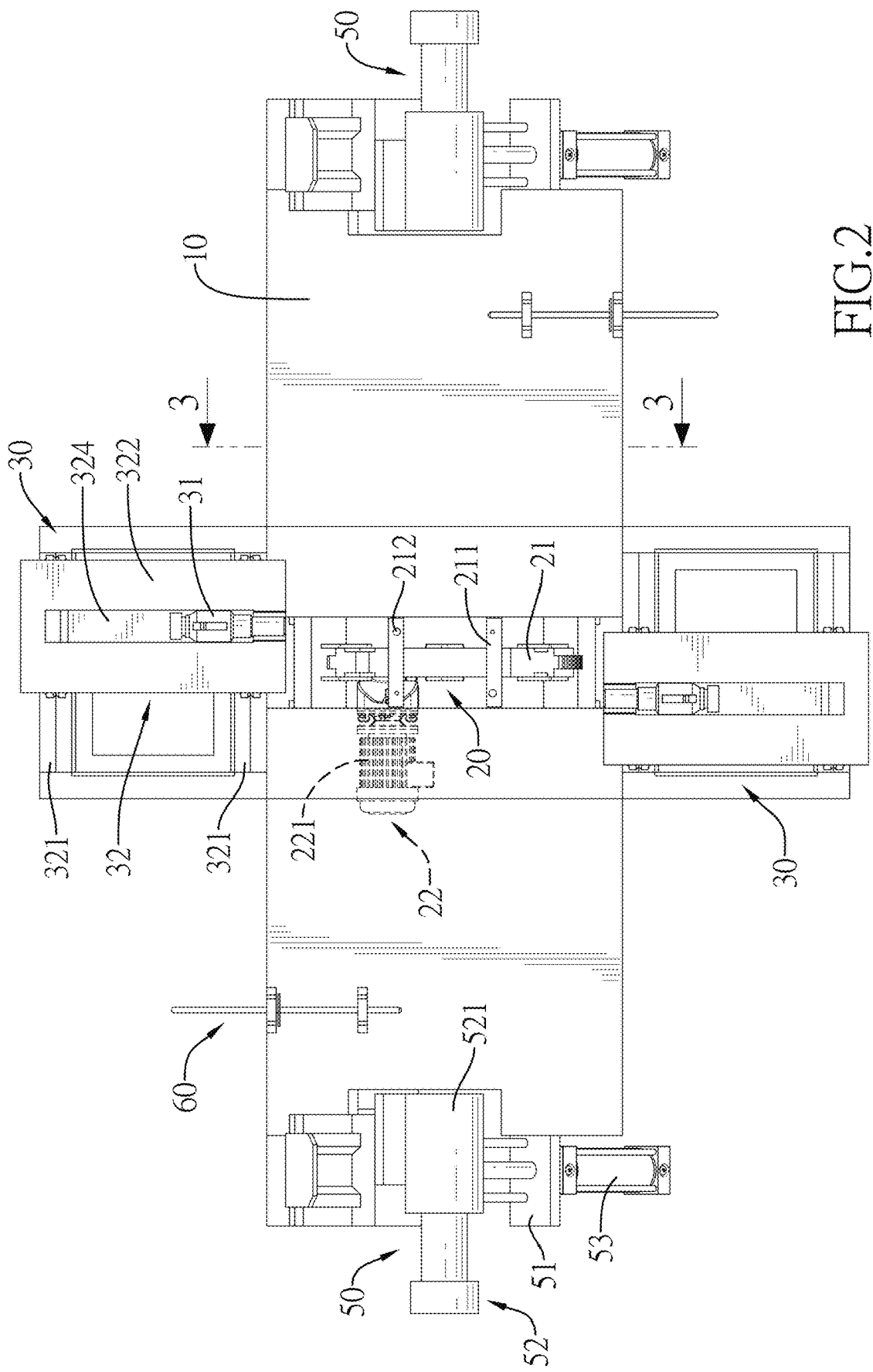
FIG. 2 is a top view of the pipe-assembling machine in accordance with the present invention.
Figure 9:
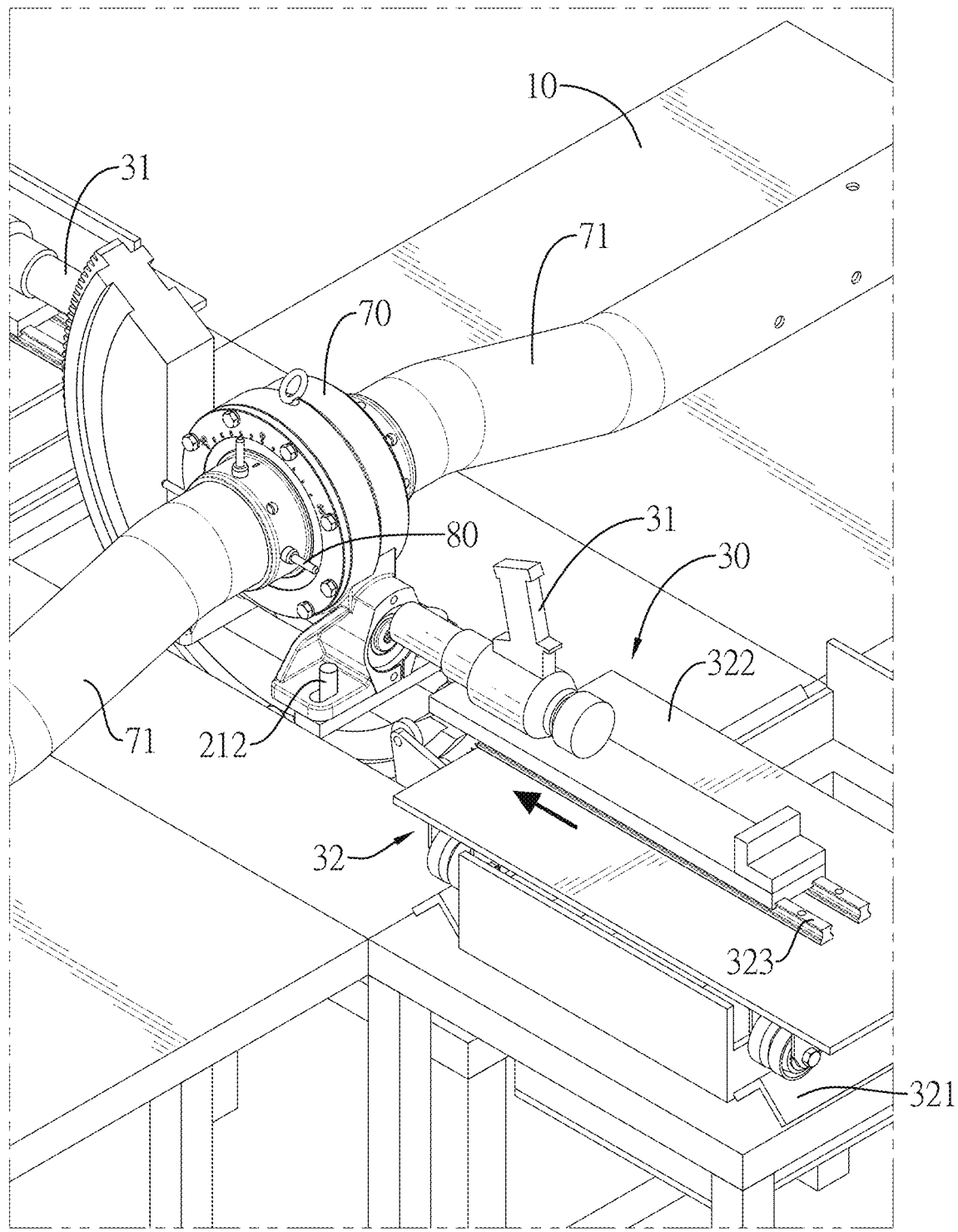
FIG. 9 is a perspective view of the pipe-assembling machine in accordance with the present invention, showing assembling fastener elements to the pipes and the reducer through assembling elements.

With reference to FIGS. 1 to 3, the two assembling devices 30 are respectively mounted at the table 10 and disposed at two sides of the rotation device 20 along the axial direction. Each one of the two assembling devices 30 has an assembling element 31 being movable parallel to the table 10 and toward the reducer 70. As shown in FIGS. 7 and 9, the connecting ends of the two pipes 71 are respectively mounted at two ends of the reducer 70. Each one of the two assembling devices 30 respectively corresponds to the two pipes 71 and assembles multiple fastener elements 80 to the multiple connecting holes of the connecting end of the corresponding pipe 71 and the reducer 70 through the assembling element 31 to assemble the corresponding pipe 71 to the reducer 70. Furthermore, the assembling elements 31 have fixed height positions and are unable to pivot.

Figure 6:
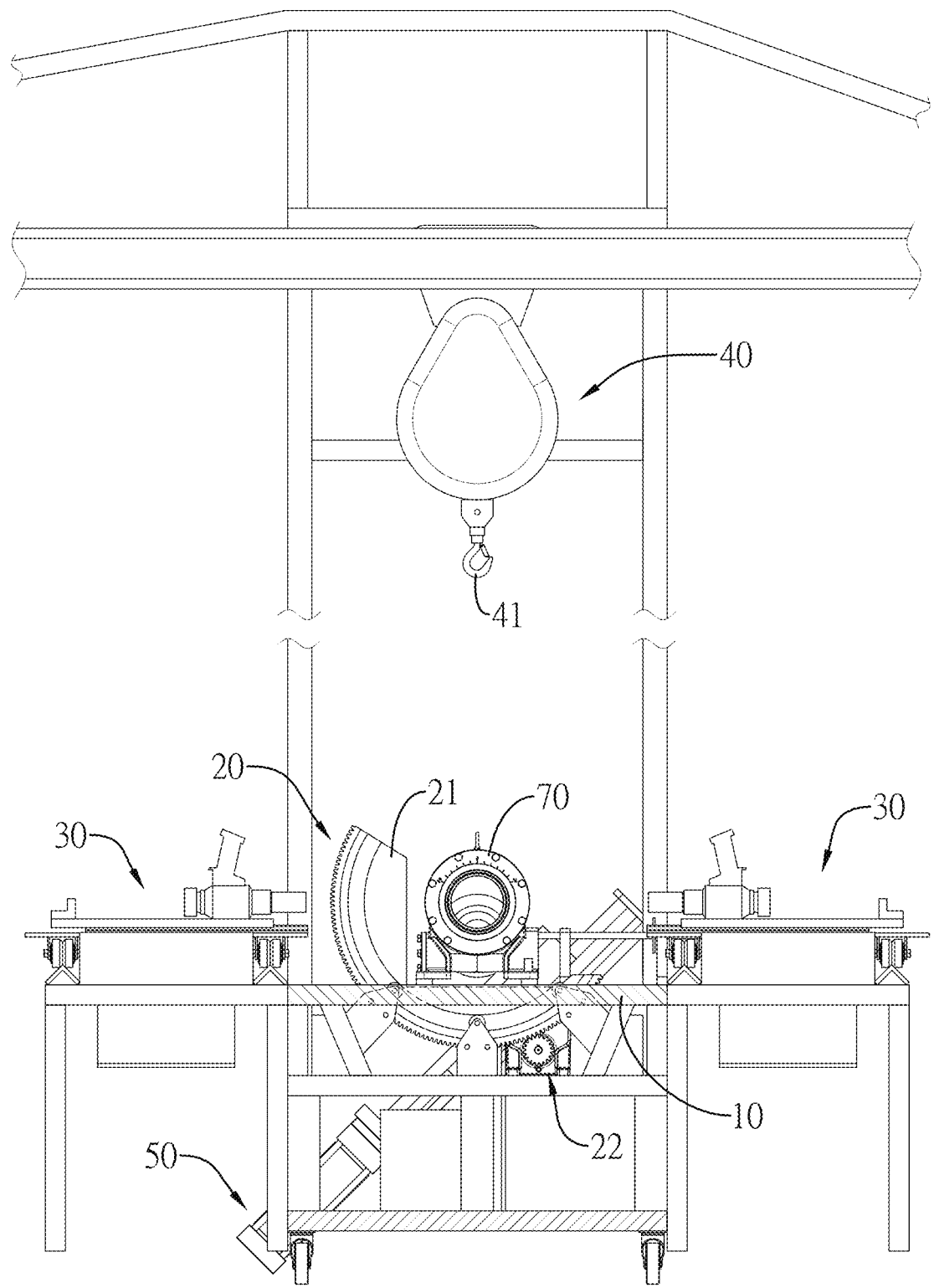
FIG. 6 is a front view of the pipe-assembling machine in accordance with the present invention, showing the reducer mounted on the base of the rotation device.

The pipe-assembling machine is configured to assemble two pipes 71 to a reducer 70. As shown in FIGS. 5 and 6, firstly, the reducer 70 is mounted on the base 21. In addition, the base 21 of the rotation device 20 has a connecting portion 211 and a positioning element 213. The connecting portion 211 has at least one positioning rod 212. The reducer 70 is detachably mounted at the connecting portion 211 of the base 21. The at least one positioning rod 212 is mounted through the reducer 70 to limit the reducer 70 in position. The positioning element 213 is detachably mounted at the connecting portion 211 and abuts the reducer 70.

Additionally, as shown in FIG. 5, the reducer 70 is placed at the connecting portion 211 of the base 21. By the at least one positioning rod 212 limiting the reducer 70 in position, the reducer 70's position is fast ensured. Then, the positioning element 213 and the connecting portion 211 abut the reducer 70 together, thereby further avoiding the reducer 70's deviating, and hence increasing positioning accuracy of the reducer 70. Preferably, the positioning element 213 is a bolt and is screwed into the connecting portion 211 to abut the reducer 70. Alternatively, the positioning element 213 abuts the reducer 70 in a hydraulic way.

Furthermore, as shown in FIG. 6, the pipe-assembling machine comprises a suspension device 40 disposed over the rotation device 20. The suspension device 40 can move horizontally and perpendicularly to the axial direction, and has a suspension element 41 movable vertically. The suspension element 41 of the suspension device 40 can be used to hook the reducer 70 to lift and move the reducer 70, thereby saving workhour and manual force. In this embodiment, the suspension device 40 is a crane.

And then, as shown in FIG. 7, the connecting ends of the two pipes 71 are preliminarily mounted respectively to the two ends of the reducer 70 along the axial direction.

Figure 8:
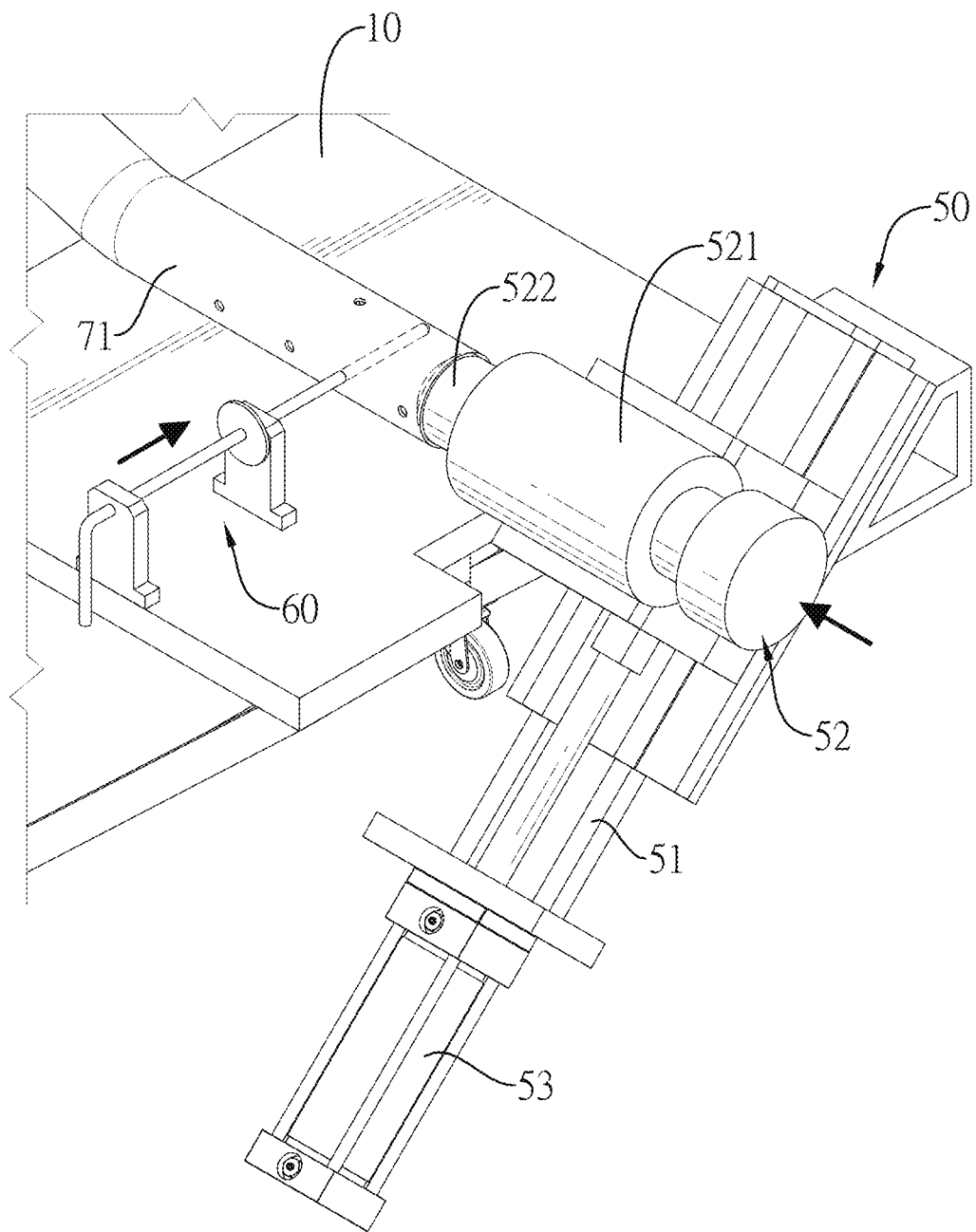
FIG. 8 is a perspective view of the pipe-assembling machine in accordance with the present invention, showing limiting the pipes in position through positioning devices and positioning pin assemblies.

Preferably, as shown in FIGS. 3, 7 and 8, the pipe-assembling machine comprises two positioning devices 50 respectively disposed at two ends of the table 10 along the axial direction and corresponding to the two pipes 71. Each positioning device 50 comprises a positioning rail 51, an extendable rod component 52 and a rod-component-driving element 53. The positioning rail 51 is mounted at the table 10 inclinedly. The extendable rod component 52 is movably mounted at the positioning rail 51. The rod-component-driving element 53 is mounted at the positioning rail 51 and can drive the extendable rod component 52 to move along the positioning rail 51. The extendable rod component 52 has a rod sleeve 521 and a positioning rod 522. The positioning rod 522 is disposed in the rod sleeve 521, and is parallel to the axial direction, and can move linearly relative to the rod sleeve 521. The positioning rod 522 is moved outwardly from the rod sleeve 521 to reach into the pipe 71 corresponding to said positioning device 50 and is moved backwardly to the rod sleeve 521 to leave the pipe 71. Additionally, a diameter of the positioning rod 522 is equal to a diameter of the pipe 71. The rod-component-driving element 53 can move the extendable rod component 52 to a first position-limited position and to a second position-limited position.

As shown in FIGS. 7 and 8, after the connecting ends of the two pipes 71 are preliminarily mounted to the reducer 70, the two positioning devices 50 are operated such that the extendable rod component 52 is moved to the first position-limited position and the extendable rod component 52 is concentric with the pipe 71 corresponding to the positioning rod 522. Then, the positioning rod 522 is moved outwardly from the rod sleeve 521 to reach into said pipe 71. By the positioning rod 522 fixing an end of said pipe 71 which is away from the reducer 70, two ends of said pipe 71 are both fixed and limited in position. So, said pipe 71 will not move around or deviate vertically or horizontally, ensuring concentricity of said pipe 71 and the reducer 70, thereby increasing assembling accuracy for follow-up assembling of the fastener elements 80.

Besides, as shown in FIGS. 7 and 8, the pipe-assembling machine comprises two positioning pin assemblies 60 respectively mounted at the two ends of the table 10 along the axial direction and disposed at the two sides of the rotation device 20. The two positioning pin assemblies 60 respectively correspond to the two pipes 71 and can be operated to reach into the two pipes 71. The two positioning pin assemblies 60 can respectively reach into lateral walls of the two pipes 71 to avoid the two pipes 71 deviating vertically or horizontally, and the two pipes 71 will not pivot along the axial direction and will not change angles, thereby increasing assembling accuracy for follow-up assembling.

As shown in FIG. 9, the assembling elements 31 of the two assembling devices 30 are operated to move the assembling elements 31 to approach the reducer 70 mounted on the base 21. The assembling elements 31 are used to assemble the multiple fastener elements 80, which are near the assembling elements 31, to the connecting holes of the connecting ends of the two pipes 71 and the reducer 70. Preferably, the assembling elements 31 of the assembling devices 30 are rivet guns, and the multiple fastener elements 80 are rivets.

In addition, as shown in FIGS. 7 and 9, each assembling device 30 comprises a moving component 32 which is adjacent to the table 10. The assembling element 31 of said assembling device 30 is mounted on the moving component 32 and is moved with the moving component 32 to move parallel to the table 10 to approach or move away from the connecting end of the corresponding pipe 71 mounted on the reducer 70 on the rotation device 20.

Furthermore, each moving component 32 comprises two longitudinal rails 321, a moving board 322, at least one horizontal rail 323 and a driven plate 324. The two longitudinal rails 321 are parallel to the axial direction and adjacent to the table 10. The moving board 322 is parallel to the table 10 and is mounted on the two longitudinal rails 321 to be moved along the two longitudinal rails 321. The at least one horizontal rail 323 is mounted on the moving board 322 and is perpendicular to the two longitudinal rails 321. The driven plate 324 is mounted on the at least one horizontal rail 323 to be moved along the at least one horizontal rail 323. The assembling element 31 of said assembling device 30 is mounted on the driven plate 324.

In addition, since the assembling element 31 of each assembling device 30 can only be moved parallel to the table 10 through the moving component 32, the assembling element 31's height position is fixed and the assembling element 31 cannot be turned randomly, thereby ensuring accuracy of assembling the fastener elements 80 through the assembling element 31. Besides, the two assembling devices 30 can be operated separately by two installation personnel. So, two connecting holes that are disposed at left and right sides of a pipe 71 and are symmetrical in position can be assembled with the fastener elements 80 at the same time, therefore the pipe 71 receives forces from two sides in balance, thus increasing the accuracy of assembling.

Figure 10:
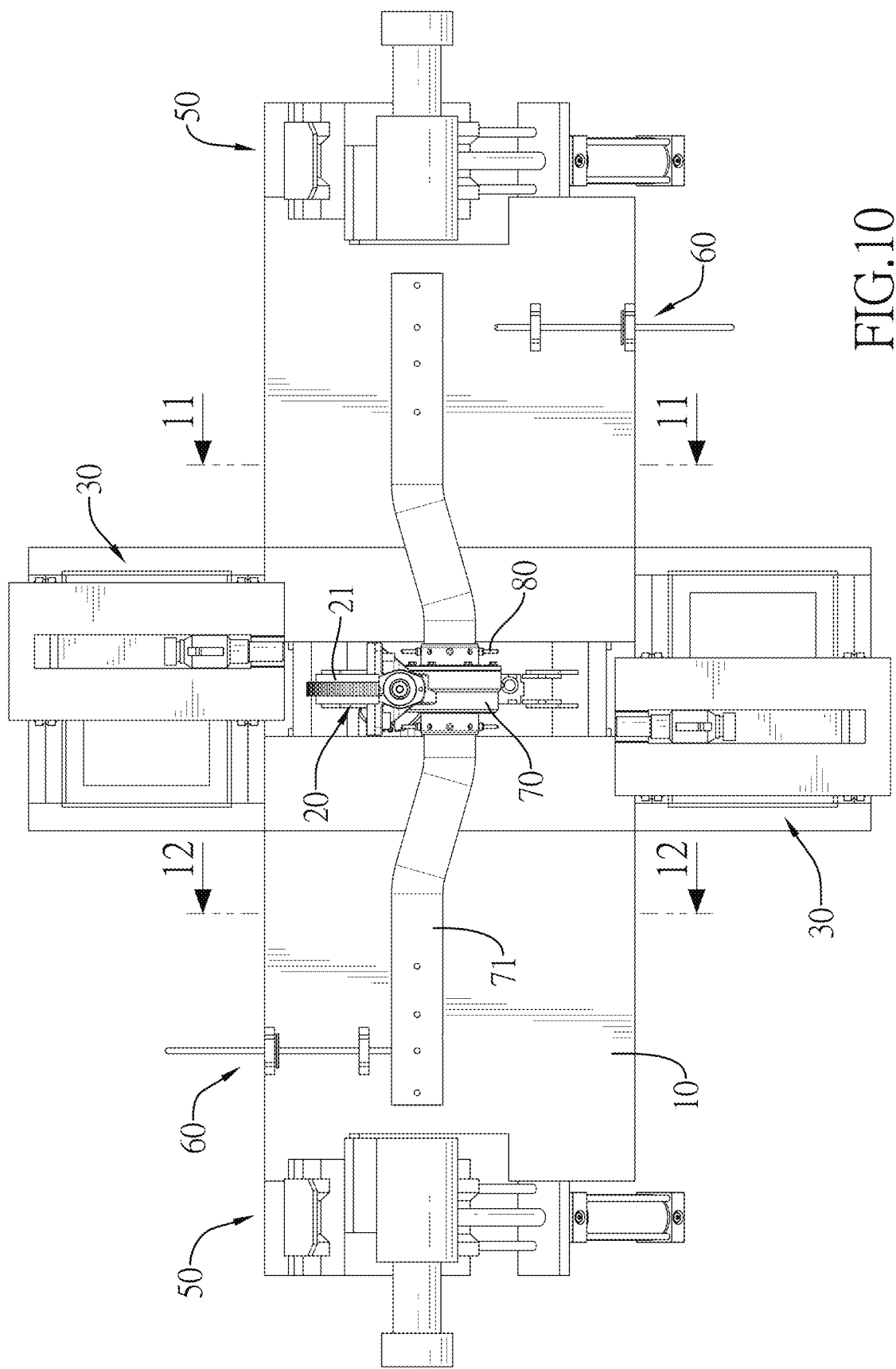
FIG. 10 is a top view of the pipe-assembling machine in accordance with the present invention, showing rotating the base, the pipes, and the reducer.
Figure 11:
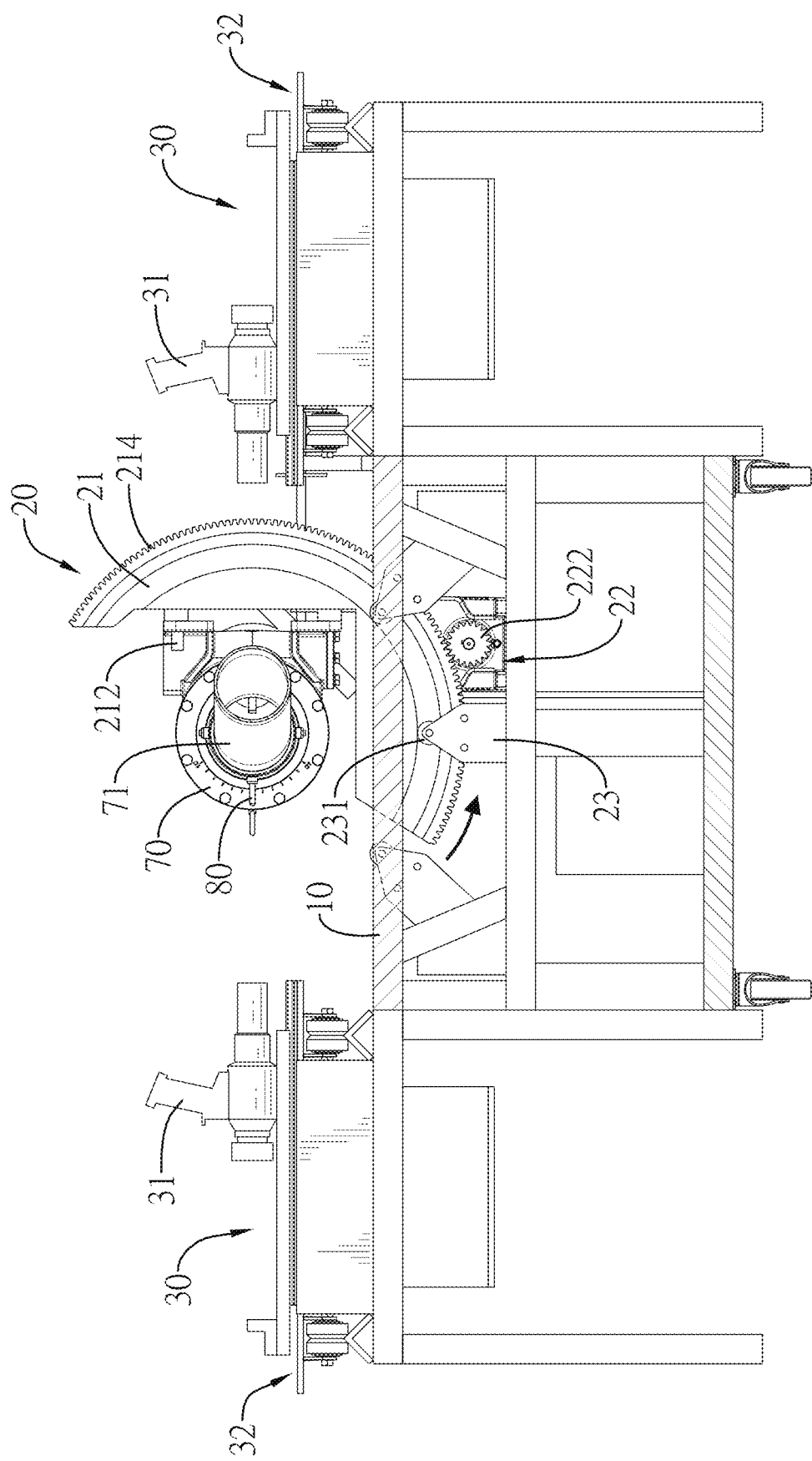
FIG. 11 is a sectional view across line 11-11 in FIG. 10, showing rotating the base, the pipes, and the reducer.

With reference to FIGS. 10 and 11, after the left and right sides of the pipe 71 are assembled with the reducer 70 through the fastener elements 80, each positioning device 50 is respectively operated to move the positioning rod 522 back to the rod sleeve 521 and leaves the corresponding pipe 71. Then, operating the rotationally-driving mechanism 22 to rotate the base 21, the reducer 70 and the two pipes 71 will be rotated, so the connecting holes of the pipes 71 that are not yet assembled with the fastener elements 80 are turned toward the assembling elements 31. Additionally, as shown in FIGS. 3, 4 and 11, the base 21 of the rotation device 20 has a gear portion 214 surrounding an outer contour of the base 21 with the axial direction as an axial center. The rotationally-driving mechanism 22 comprises a rotationally-driving element 221 and a driving gear 222. The rotationally-driving element 221 is mounted at a bottom side of the table 10 and is connected to the driving gear 222. The driving gear 222 meshes with the gear portion 214 of the base 21. The rotationally-driving element 221 drives the driving gear 222 to rotate, so that the driving gear 222 drives the base 21 to rotate. The reducer 70 and the two pipes 71 are driven by the rotation device 20 without manual interference, thereby saving workhours and manual force, and increasing work efficiency.

Furthermore, the rotation device 20 comprises multiple guiding components 23 disposed at a bottom side of the table 10 at spaced intervals. Each guiding component 23 has at least one support wheel 231 being rotatable and abutting the base 21. Since the at least one support wheel 231 of the multiple guiding components 23 abuts the base 21, it gives the base 21 support when rotating, thereby increasing rotational stability of the base 21.

Figure 12:
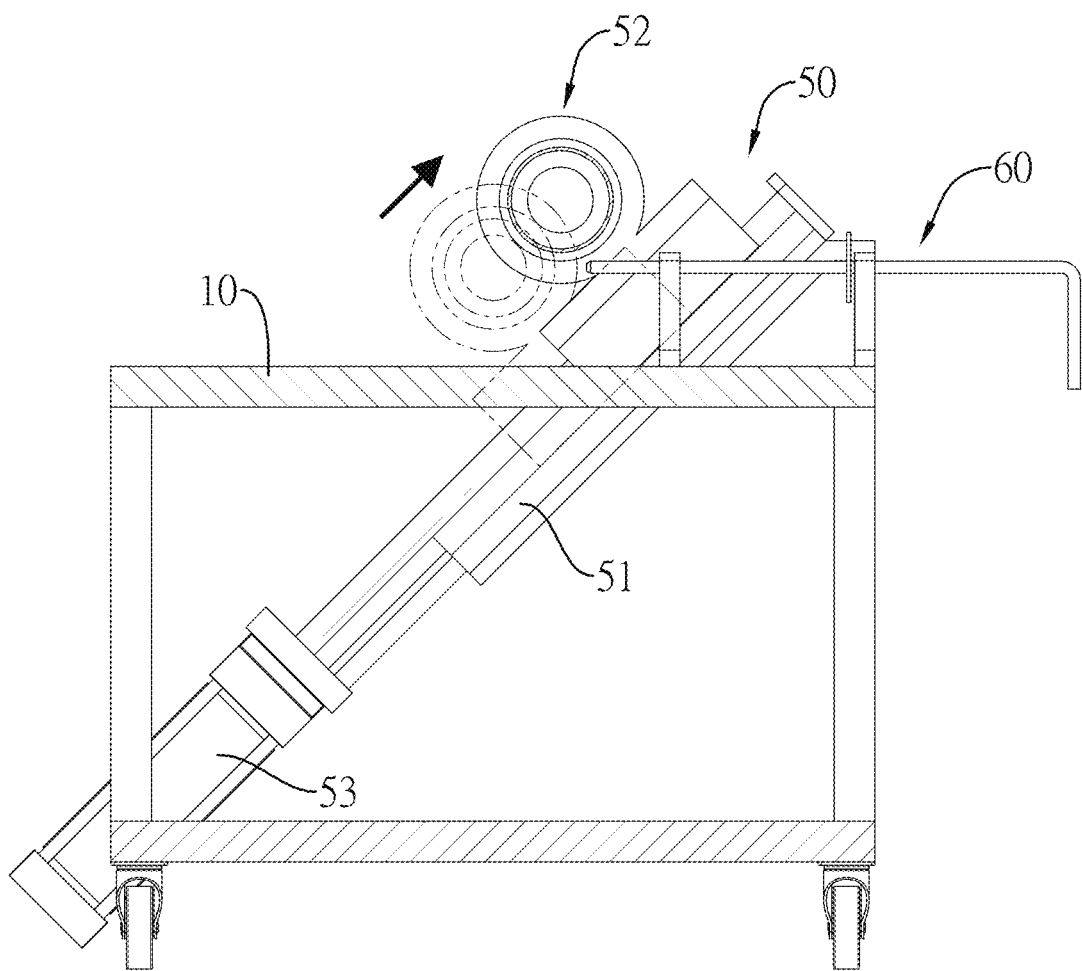
FIG. 12 is a sectional view across line 12-12 in FIG. 10, showing moving an extendable rod component of the positioning devices from a first position-limited position to a second position-limited position.
Figure 13:
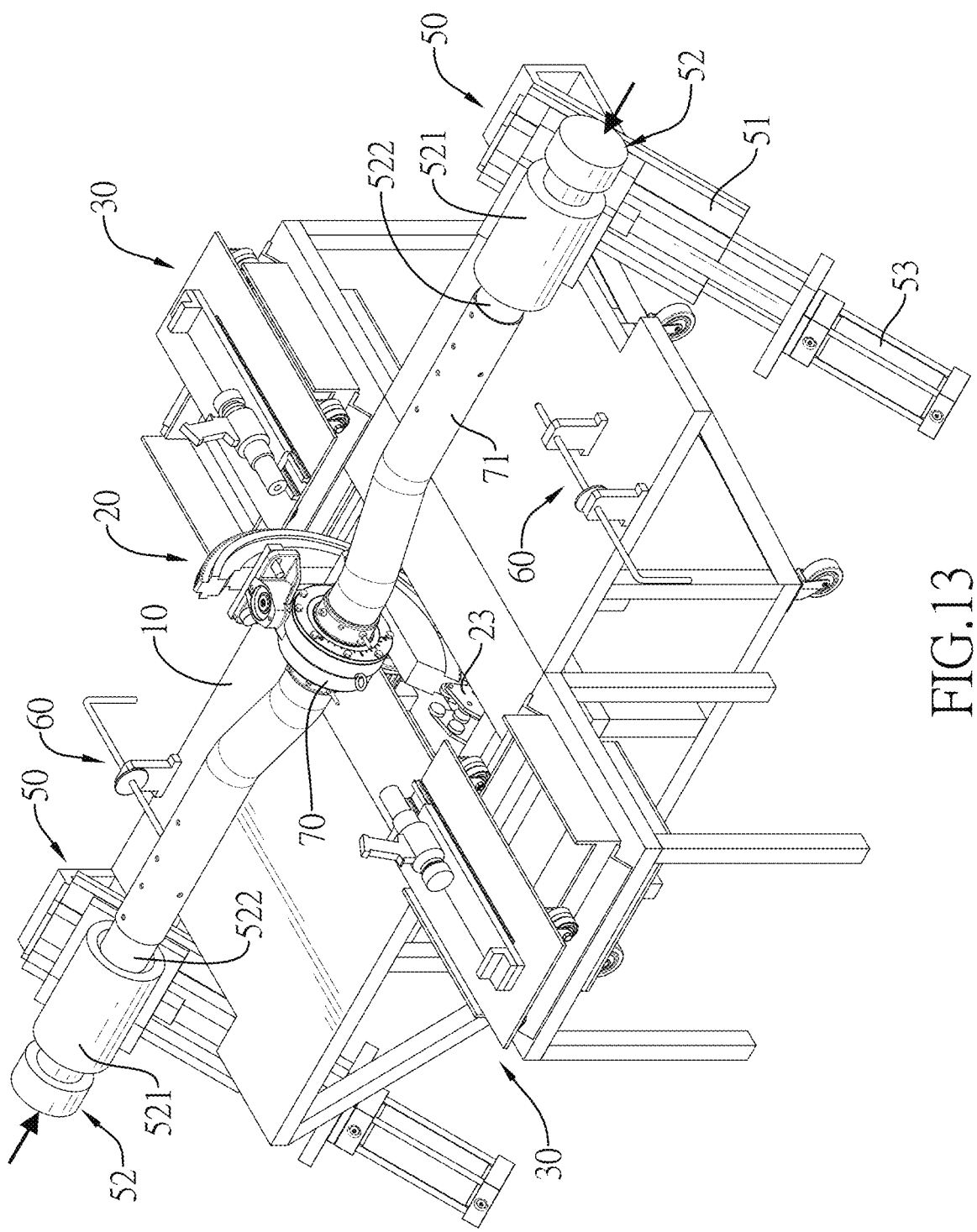
FIG. 13 is a perspective view of the pipe-assembling machine in accordance with the present invention, showing the positioning devices positioning the pipe at the second position-limited position.

As shown in FIGS. 12 and 13, after the rotation device 20 rotates the reducer 70 and the two pipes 71 until the connecting holes of the pipes 71 that are not yet assembled with the fastener elements 80 face toward the assembling elements 31, the personnel operate the two positioning devices 50. The rod-component-driving element 53 of each positioning device 50 drives the extendable rod component 52 to move to the second position-limited position, then the positioning rod 522 of the extendable rod component 52 is moved outwardly from the rod sleeve 521 to reach into the corresponding pipe 71, thereby limiting each pipe 71 in position again. And then, the personnel operate the assembling elements 31 to assemble the fastener elements 80 to the pipes 71 and the reducer 70.

Besides, in this embodiment, the connecting end of the pipe 71 has the connecting holes formed every 45 degrees equi-angularly around it, so the pipe 71 has eight of the connecting holes. When rotating, the base 21 of the rotation device 20 rotates for 90 degrees. Therefore, when assembling the pipes 71 and the reducer 70, the positioning devices 50 assure that the pipes 71 are limited in position during the first two times of assembling the fastener elements 80, thereby further increasing the assembling accuracy.

Later, since four connecting holes, which are two pairs facing each other, of either one of the pipes 71 have been assembled with the fastener elements 80, the pipes 71 and the reducer 70 are substantially stably assembled. The reducer 70 is operated to rotate the two pipes 71 for 45 degrees, then again the two assembling devices 30 are operated to assemble the pipes 71 and the reducer 70 through the fastener elements 80. Finally, operating the rotation device 20 to rotate the base 21 backward for 90 degrees and finishing assembling the pipes 71 and the reducer 70 through operating the two assembling devices 30, the reducer 70 and the pipes 71 that are fixedly assembled together can be suspended through the suspension device 40 to be detached from the base 21.

In this embodiment, by operating the reducer 70 to rotate the two pipes 71, the base 21 can be designed for only needing to rotate for 90 degrees, thereby reducing mechanical designs of the rotation device 20 to cut down costs. However, in other embodiments, margins of rotational degree of the base 21 are not limited, the base 21 of the rotation device 20 can be designed to have a wider margin of rotational degree as long as the connecting holes of the pipes 71 can align with the assembling elements 31 for assembling the fastener elements 80. Therefore, operating the reducer 70 to rotate the two pipes 71 is not a necessary step.

To sum up, the pipe-assembling machine is configured to assemble two pipes 71 to a reducer 70. The two assembling devices 30 can assemble multiple fastener elements 80 to the two pipes 71 and the reducer 70. Because the assembling elements 31 of the two assembling devices 30 can only be moved parallel to the table 10, the accuracy of assembling the fastener elements 80 is ensured. The reducer 70 and the two pipes 71 are rotated by the rotation device 20 without manual interference, thereby saving workhours and manual force, and increasing work efficiency. Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pipe-assembling machine configured to assemble two pipes to a reducer along an axial direction, wherein each one of the two pipes has a connecting end having multiple connecting holes, which are formed on a surrounding wall of the pipe and surrounding the connecting end at spaced intervals with the axial direction as an axial center, the connecting ends of the two pipes respectively mounted at two ends of the reducer:

the pipe-assembling machine comprising:
  a table;
  a rotation device comprising:
    a base pivotably mounted on the table and being pivotable along the axial direction; the base configured for detachably mounting the reducer;
    a rotationally-driving mechanism mounted at the table, connected to the base, and being able to drive the base to pivot; and
  two assembling devices respectively mounted at the table and disposed at two sides of the rotation device along the axial direction; each one of the two assembling devices having an assembling element being movably parallel to the table and toward the reducer; the two assembling devices configured for respectively corresponding to the two pipes; each one of the two assembling devices configured for assembling multiple fastener elements to the multiple connecting holes of the connecting end of the corresponding pipe and the reducer through the assembling element to assemble the corresponding pipe to the reducer.

2. The pipe-assembling machine as claimed in claim 1, wherein the pipe-assembling machine comprises:
  two positioning devices disposed respectively at two ends of the table along the axial direction and configured for respectively corresponding to the two pipes; each one of the two positioning devices comprising:
    a positioning rail inclinedly mounted at the table;
    an extendable rod component movably mounted at the positioning rail and having:
      a rod sleeve;
      a positioning rod disposed in the rod sleeve, being parallel to the axial direction, and being moveable linearly relative to the rod sleeve; the positioning rod moved outwardly from the rod sleeve to be configured to reach into the pipe corresponding to said positioning device, and moved backwardly to the rod sleeve to leave said pipe; and
    a rod-component-driving element mounted at the positioning rail and driving the extendable rod component to move along the positioning rail.

3. The pipe-assembling machine as claimed in claim 2, wherein the pipe-assembling machine comprises:
  two positioning pin assemblies disposed respectively at the two ends of the table along the axial direction, disposed respectively at the two sides of the rotation device, and configured for respectively corresponding to the two pipes; each one of the two positioning pin assemblies configured for selectively extending into the corresponding pipe.

4. The pipe-assembling machine as claimed in claim 3, wherein the pipe-assembling machine comprises:
  a suspension device disposed over the rotation device, being movable horizontally and perpendicularly to the axial direction, and having:
    a suspension element being movable vertically.

5. The pipe-assembling machine as claimed in claim 4, wherein the base of the rotation device has:
  a connecting portion having:
    at least one positioning rod; the connecting portion of the base configured for detachably mounting the reducer; the at least one positioning rod configured for mounting through the reducer to limit the reducer in position; and
  a positioning element detachably mounted at the connecting portion and configured for abutting the reducer.

6. The pipe-assembling machine as claimed in claim 5, wherein
  the base of the rotation device has
    a gear portion surrounding an outer contour of the base with the axial direction as an axial center;
  the rotationally-driving mechanism comprises
    a rotationally-driving element mounted at a bottom side of the table; and
    a driving gear meshing with the gear portion of the base;
  the rotationally-driving element is connected to the driving gear and drives the driving gear to rotate and thereby driving the base to rotate.

7. The pipe-assembling machine as claimed in claim 6, wherein the rotation device comprises
  multiple guiding components disposed at a bottom side of the table at spaced intervals; each one of the multiple guiding components having
    at least one support wheel being rotatable and abutting the base.

8. The pipe-assembling machine as claimed in claim 7, wherein:
  each one of the two assembling devices comprises:
    a moving component adjacent to the table;
  the assembling element of said assembling device is mounted on the moving component and is moved with the moving component to move parallel to the table to be configured to approach or move away from the connecting end of the corresponding pipe.

9. The pipe-assembling machine as claimed in claim 8, wherein:
  each moving component comprises:
    two longitudinal rails adjacent to the table and parallel to the axial direction;
    a moving board parallel to the table and mounted on the two longitudinal rails to be moved along the two longitudinal rails;

at least one horizontal rail mounted on the moving board and perpendicular to the two longitudinal rails; and a driven plate mounted on the at least one horizontal rail to be moved along the at least one horizontal rail;

the assembling element is mounted on the driven plate.

10. The pipe-assembling machine as claimed in claim 3, wherein the base of the rotation device has:

a connecting portion having:
at least one positioning rod; the connecting portion of the base configured for detachably mounting the reducer; the at least one positioning rod configured for mounting through the reducer to limit the reducer in position; and a positioning element detachably mounted at the connecting portion and configured for abutting the reducer.

11. The pipe-assembling machine as claimed in claim 3, wherein the base of the rotation device has
a gear portion surrounding an outer contour of the base with the axial direction as an axial center;

the rotationally-driving mechanism comprises
a rotationally-driving element mounted at a bottom side of the table; and
a driving gear meshing with the gear portion of the base;

the rotationally-driving element is connected to the driving gear and drives the driving gear to rotate and thereby driving the base to rotate.

12. The pipe-assembling machine as claimed in claim 3, wherein the rotation device comprises multiple guiding components disposed at a bottom side of the table at spaced intervals; each one of the multiple guiding components having
at least one support wheel being rotatable and abutting the base.

13. The pipe-assembling machine as claimed in claim 3, wherein:

each one of the two assembling devices comprises:
a moving component adjacent to the table;
the assembling element of said assembling device is mounted on the moving component and is moved with the moving component to move parallel to the table to be configured to approach or move away from the connecting end of the corresponding pipe.

14. The pipe-assembling machine as claimed in claim 1, wherein the pipe-assembling machine comprises:

two positioning pin assemblies disposed respectively at two ends of the table along the axial direction, disposed respectively at the two sides of the rotation device, and configured for respectively corresponding to the two pipes; each one of the two positioning pin assemblies configured for selectively extending into the corresponding pipe.

15. The pipe-assembling machine as claimed in claim 1, wherein the pipe-assembling machine comprises:

a suspension device disposed over the rotation device, being movable horizontally and perpendicularly to the axial direction, and having:
a suspension element being movable vertically.

16. The pipe-assembling machine as claimed in claim 1, wherein the base of the rotation device has:

a connecting portion having:
at least one positioning rod; the connecting portion of the base configured for detachably mounting the reducer; the at least one positioning rod configured for mounting through the reducer to limit the reducer in position; and a positioning element detachably mounted at the connecting portion and configured for abutting the reducer.

17. The pipe-assembling machine as claimed in claim 1, wherein the base of the rotation device has
a gear portion surrounding an outer contour of the base with the axial direction as an axial center;

the rotationally-driving mechanism comprises
a rotationally-driving element mounted at a bottom side of the table; and
a driving gear meshing with the gear portion of the base;

the rotationally-driving element is connected to the driving gear and drives the driving gear to rotate and thereby driving the base to rotate.

18. The pipe-assembling machine as claimed in claim 1, wherein the rotation device comprises multiple guiding components disposed at a bottom side of the table at spaced intervals; each one of the multiple guiding components having
at least one support wheel being rotatable and abutting the base.

19. The pipe-assembling machine as claimed in claim 1, wherein each one of the two assembling devices comprises:
a moving component adjacent to the table;
the assembling element of said assembling device is mounted on the moving component and is moved with the moving component to move parallel to the table to be configured to approach or move away from the connecting end of the corresponding pipe.

20. The pipe-assembling machine as claimed in claim 19, wherein:

each moving component comprises:
two longitudinal rails adjacent to the table and parallel to the axial direction;
a moving board parallel to the table and mounted on the two longitudinal rails to be moved along the two longitudinal rails;
at least one horizontal rail mounted on the moving board and perpendicular to the two longitudinal rails; and
a driven plate mounted on the at least one horizontal rail to be moved along the at least one horizontal rail;
the assembling element is mounted on the driven plate.

* * * * *